United States Patent [19]

Corley, Jr.

[11] 4,395,187

[45] Jul. 26, 1983

[54] AUTOMATIC CARGO ELEVATOR FOR VEHICLE

[76] Inventor: Quentin D. Corley, Jr., 326 S. Rock Island, Dallas, Tex. 75207

[21] Appl. No.: 200,317

[22] Filed: Oct. 24, 1980

[51] Int. Cl.³ .............................................. B60P 1/48
[52] U.S. Cl. .................................... 414/557; 414/558; 187/9 R; 296/57 R
[58] Field of Search ............... 187/9 R, 1 R; 414/921, 414/917, 546, 557, 558, 556; 296/55, 57 R, 56; 280/166, 163

[56] References Cited

U.S. PATENT DOCUMENTS

| | | | |
|---|---|---|---|
| 2,792,135 | 5/1957 | Wood | 414/557 |
| 3,257,011 | 6/1966 | Randall et al. | 414/557 |
| 3,282,451 | 11/1966 | Corley, Jr. | 414/558 |
| 3,369,678 | 2/1968 | Robinson | 414/558 |
| 3,799,373 | 3/1974 | Randall | 414/557 |
| 3,883,014 | 5/1975 | Glomski et al. | 414/557 |
| 4,078,676 | 3/1978 | Mortenson | 414/558 |
| 4,111,317 | 9/1978 | Robinson | 414/557 |

*Primary Examiner*—Kenneth W. Noland
*Attorney, Agent, or Firm*—Peter J. Murphy

[57] ABSTRACT

A cargo elevator, designed particularly for attachment to the rear end of a truck or trailer having a cargo bed, includes a mounting frame secured at the rear end of the cargo bed and disposed downwardly and forwardly with the forward end secured to the vehicle frame. The mounting frame includes aligned and axially spaced bearing sleeves for rotatably supporting a torque shaft and the mounting frame supports an hydraulic power cylinder, acting on a radial arm of the torque shaft between the sleeves to oscillate the torque shaft. Elevator platform lift arms are nonrotatably fixed to the ends of the torque shaft, and parallel arms are pivotally mounted on the mounting frame; and these are pivotally attached to a base platform of the elevator platform, to maintain it generally horizontal. The elevator platform includes an outer folding platform hinged to the base platform; and an articulated locking and folding mechanism, connected between fixed pivots on the base platform and folding platform, effects the unfolding of and locking of the folding platform in the load position and the folding of the platform to a stored position. An actuator arm pivotally mounted on the cargo bed may be engaged with an actuator lever of the articulated mechanism, to effect the folding of the folding platform during upward movement of the base platform, and to effect unfolding of the folding platform during downward movement of the base platform.

17 Claims, 11 Drawing Figures

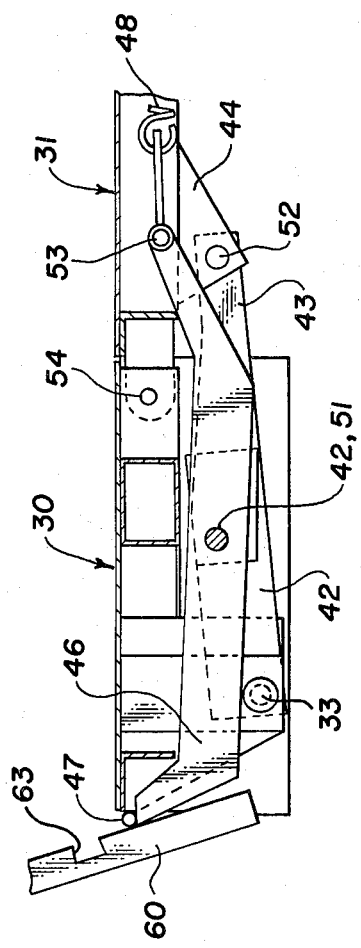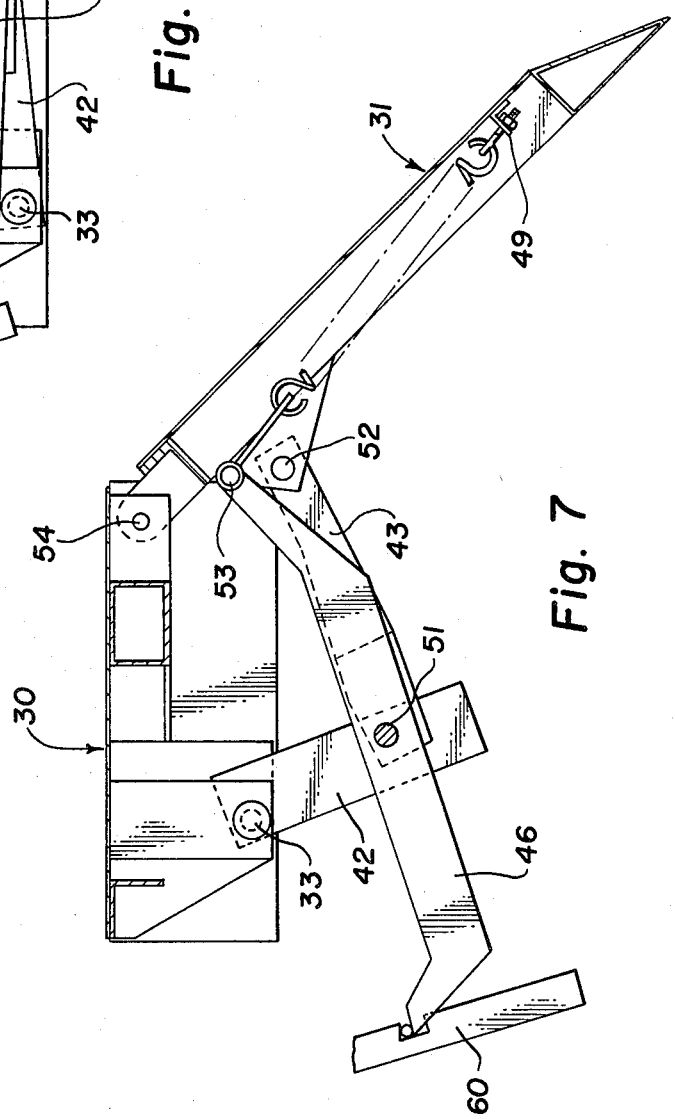

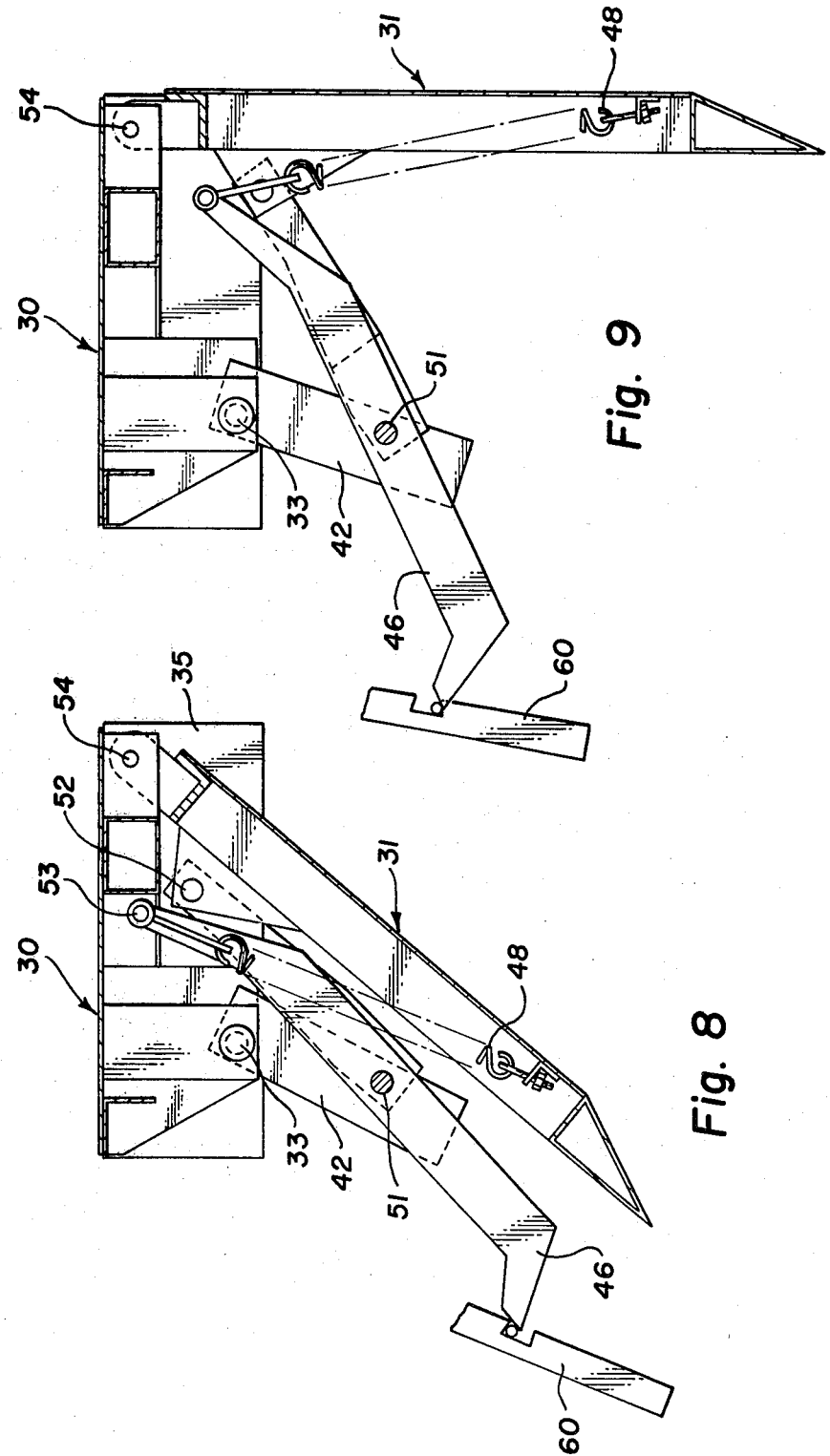

AUTOMATIC CARGO ELEVATOR FOR VEHICLE

This invention relates to a cargo elevator, sometimes referred to as a lift gate, for attachment to a cargo vehicle such as a truck or trailer, particularly to the rear loading end of such truck or trailer. More particularly, this invention relates to such cargo elevator in which movements between the operative load positions and a stored position are fully powered. Still more particularly, this invention relates to such fully powered cargo elevator having a foldable elevator platform which, in the stored position, is tucked under the plane of the vehicle cargo bed.

A principal object of this invention is to provide such cargo elevator which is fully powered to raise and lower cargo from ground level to cargo bed level, and which is fully powered to move the elevator platform between load and storage positions.

Another object of this invention is to provide such cargo elevator wherein the elevator platform is foldable and is tucked under the plane of the vehicle cargo bed in the stored position for maximum protection against damage.

A further object of this invention is to provide such cargo elevator which, in the stored position, allows access to the cargo body without operating the elevator, and allows backup to a cargo dock for lift truck loading and unloading operations.

Still another object of this invention is to provide such cargo elevator wherein the elevator platform may be rotated to a vertical storage position to function, possibly, as the closing gate for the cargo body.

A still further object of this invention is to provide such cargo elevator wherein a single power unit effects the raising and lowering of the elevator platform, and also effects the folding and unfolding of the elevator platform.

These objects are accomplished in a cargo elevator for attachment to a cargo vehicle having a cargo bed. The cargo elevator includes a mounting frame for attachment to the vehicle under the cargo bed, adjacent to a loading station of the bed. A torque shaft is rotatably supported in the mounting frame adjacent to its lower extremity; and an hydraulic power cylinder is supported in the mounting frame for oscillating the torque shaft about its axis. At least one lift arm is nonrotatably mounted on the torque shaft; and at least one parallel arm is rotatably mounted on the mounting frame about an axis adjacent to the torque shaft. An elevator platform includes a base platform pivotally mounted on the lift and stabilizer arms in a manner to maintain the base platform in a generally horizontal position relative to the horizontal cargo bed, and a folding platform hingedly attached to the base platform about an axis parallel to that of the torque shaft.

An articulated locking and folding mechanism is connected between fixed pivots on the base platform and folding platform respectively including an actuator lever having an inner end projecting beyond the inner edge of said base platform. An actuator arm is pivotally mounted on the cargo bed to be swung into engagement with the projecting inner end of the actuator lever. The actuator arm is engageable with the actuator lever, during upward movement of the elevator platform, to effect the folding of the folding platform to a stored position under the base platform and the cargo bed; and the engaged actuator arm and actuator lever effect the unfolding of the folding platform, during downward movement of the elevator platform, to the extended load position, and effect the locking of the folding platform in that load position.

The novel features and the advantages of the invention, as well as additional objects thereof, will be understood more fully from the following description when read in connection with the accompanying drawings.

DRAWINGS

FIG. 6 is a fragmentary sectional view of the elevator platform, taken along the line 6—6 of FIG. 5, showing the platform locking and folding mechanism, with the platform in the load position.

FIG. 7 is a fragmentary view, taken in the plane of FIG. 6, showing the platform after initial folding movement;

FIG. 8 is a fragmentary view, taken in the plane of FIG. 6, showing the platform in the fully tucked position;

FIG. 9 is a fragmentary view, taken in the plane of FIG. 6, showing the platform starting to unfold from the tucked position.

DESCRIPTION OF THE PREFERRED EMBODIMENTS

Figure 1:
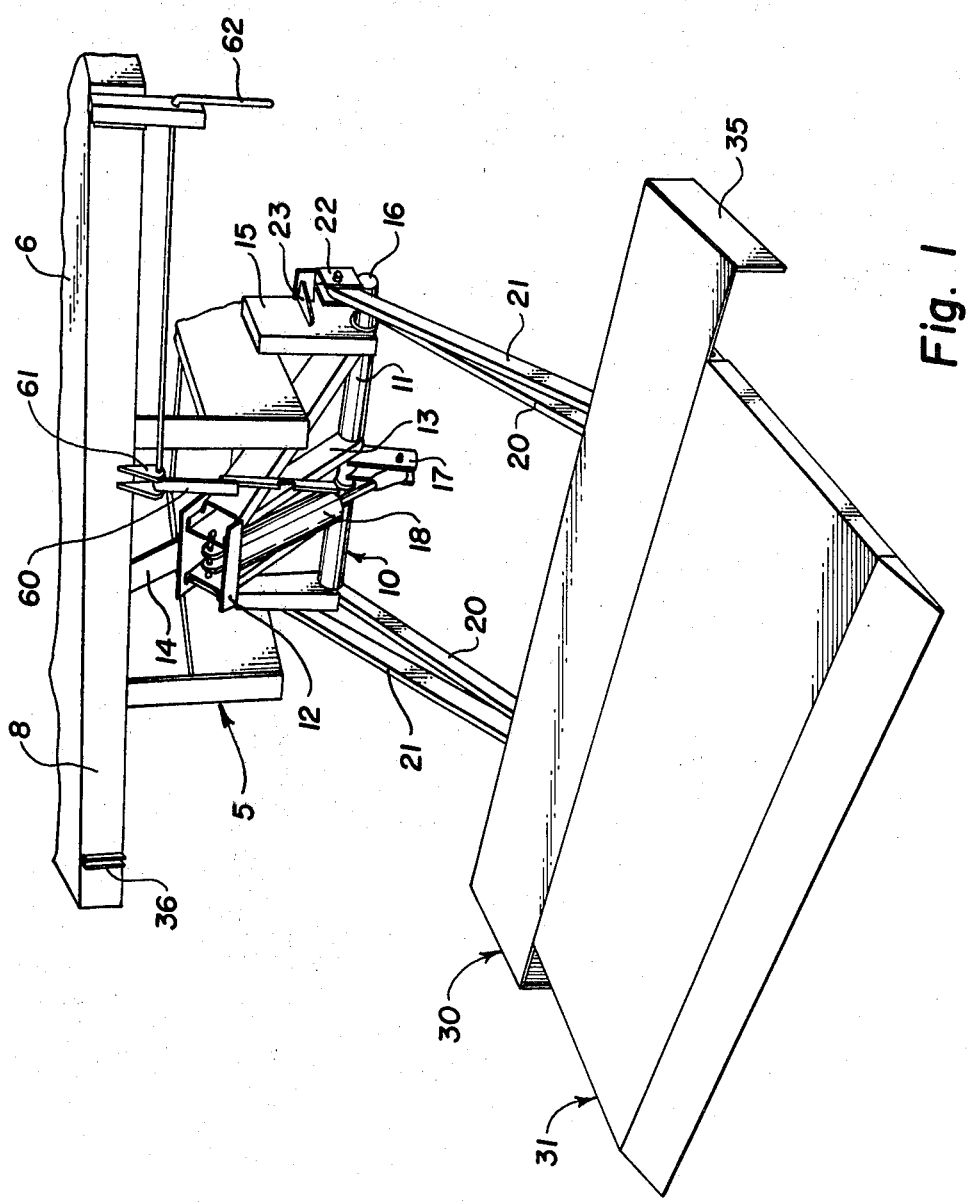
FIG. 1 is a rear view of a folding cargo elevator attached to the rear end of a truck, with the elevator in the ground position.
Figure 3:
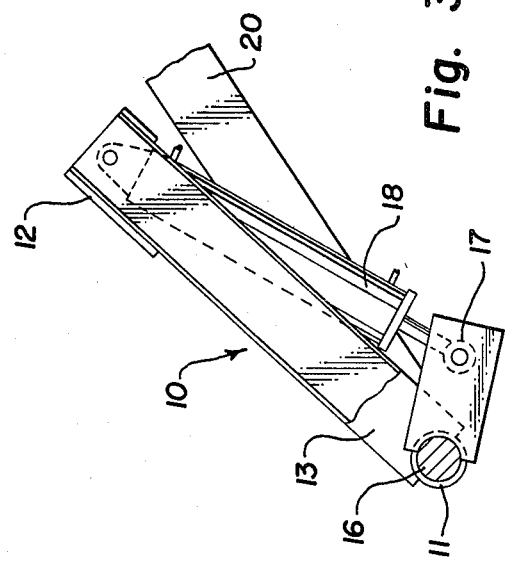
FIG. 3 is a fragmentary view, partially broken away, showing the mounting frame and power mechanism for the cargo elevator.
Figure 2:
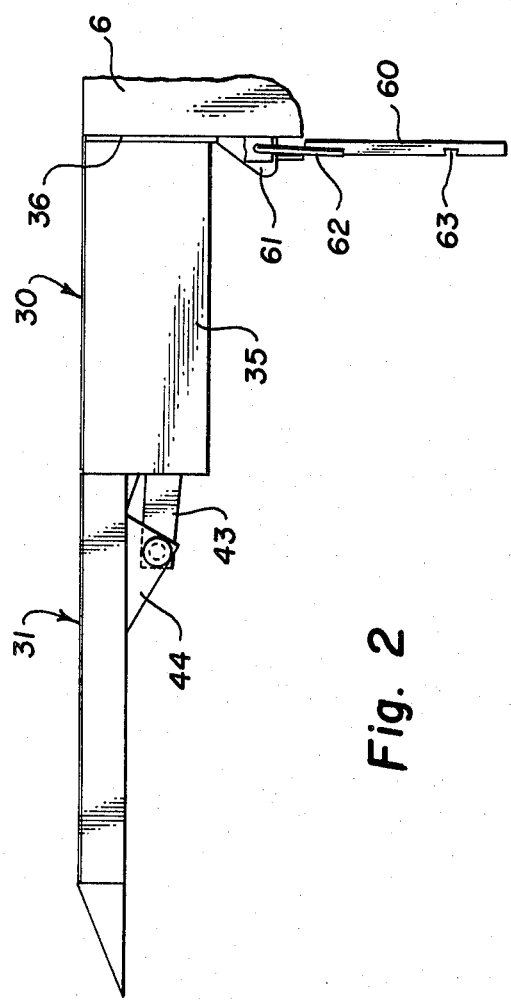
FIG. 2 is a side view of the cargo elevator of FIG. 1, with the elevator in the bed position.
Figure 4:
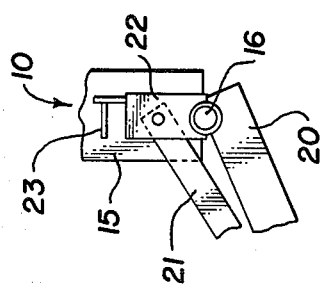
FIG. 4 is a fragmentary view showing the mounting of the parallel arms on the mounting frame.

The cargo elevator described and illustrated is mounted at the rear end of a truck 5 having a cargo body mounted on the truck frame. The cargo body has a cargo bed 6, may have side walls, and may or may not have a rear door or an end gate. The cargo body has a rear body cross member or bolster 8 mounted at the rear end of the cargo body.

A mounting frame 10 for the cargo elevator is an A-shaped frame 10 including a pair of axially aligned and spaced bearing sleeves 11 at the lower base end. A short parallel header 12 defines the upper apex end; and this header is connected to the inner ends of the bearing sleeves by a pair of vertical stringers 13. The mounting frame header 12 is disposed generally beneath the rear body cross member 8 and is secured thereto by a rear bracket 14. The bearing sleeve end of the frame is disposed inward from the rear end of the cargo bed 6, so that the frame is angled inwardly or forwardly from the rear body cross member, about 45° for example. A pair of front brackets 15, fixed to the outer ends of the mounting frame bearing sleeves, are secured to the underside of the truck frame or body.

A torque shaft 16 is rotatably supported in the bearing sleeves 11, having a length to extend beyond the outer ends of the bearing sleeves, and has a radial torque arm 17 fixed thereto intermediate its ends between the two bearing sleeves. An extensible hydraulic power cylinder 18 is disposed between the stringers 13, and is connected between a pivot mounting adjacent to the frame header 12 and a pivot mounting on the torque arm, to oscillate the torque shaft relative to the mounting frame.

A pair of lift arms 20 are nonrotatably secured to the torque shaft, adjacent to the outer ends of the bearing sleeves 11, and extend generally rearwardly to support the elevator platform as will be described. A pair of parallel arms 21 are pivotally attached to respective arm brackets 22, which are rotatably carried at the outer ends of the torque shaft 16. These arm brackets include pivot mountings for the parallel arms which are parallel to the axis of the torque shaft; and these brackets are normally disposed with the arm pivot axes directly above the torque shaft axis. The arm brackets 22 and the frame front brackets 15 include coacting structure to limit the rotational movement of these arm brackets toward the rear. These arm brackets, then, are free to rotate in a forward direction at least 90° to enable an alternative function which will be described subsequently. However, the loading of the cargo elevator will normally maintain these arm brackets 22 in the described vertical position; and, in this functional position, the arm brackets 22 are effectively a part of the mounting frame 10.

The elevator platform includes a base platform 30, which is the inner section of the platform, and a folding platform 31 hinged to the base platform and providing the outer section of the platform. The base platform 30 is generally coextensive in lateral width with the cargo bed; and is carried on the supporting structure so that the plane of the cargo surface is disposed in the plane of the cargo bed surface when the cargo elevator is in the up position referred to hereinafter as the bed position.

The base platform has arm brackets 32 mounted on the under side and providing vertically aligned lift arm pivots 33 and parallel arm pivots 34 for the securing of the base platform to the lift and parallel arms. These arms define a parallelogram mounting for the base platform, to maintain the platform in planes generally parallel to the cargo bed plane during all positions and operations of the cargo elevator. In the bed position of the elevator, the inner edge of the base platform is butted against the rear body cross member 8; and the side edges of the base platform are provided with side plates 35 which extend slightly rearward from the outer edge of the base platform to take any compression load when the truck is backed against a loading dock. In the bed position, the inner ends of these side plates are received between stabilizer ribs 36 mounted on the rear body cross member 8. This stabilizes the elevator platform against lateral movement.

The folding platform 31 is narrower in lateral width than the base platform; and this folding platform is foldable from an extended position or load position (FIGS. 1, 2, 5 and 6) in which it is co-planar with the base platform, to a tucked position (FIG. 8) wherein it had been folded about 135° from the load position and is tucked under the base platform at an angle of about 45°.

Figure 5:
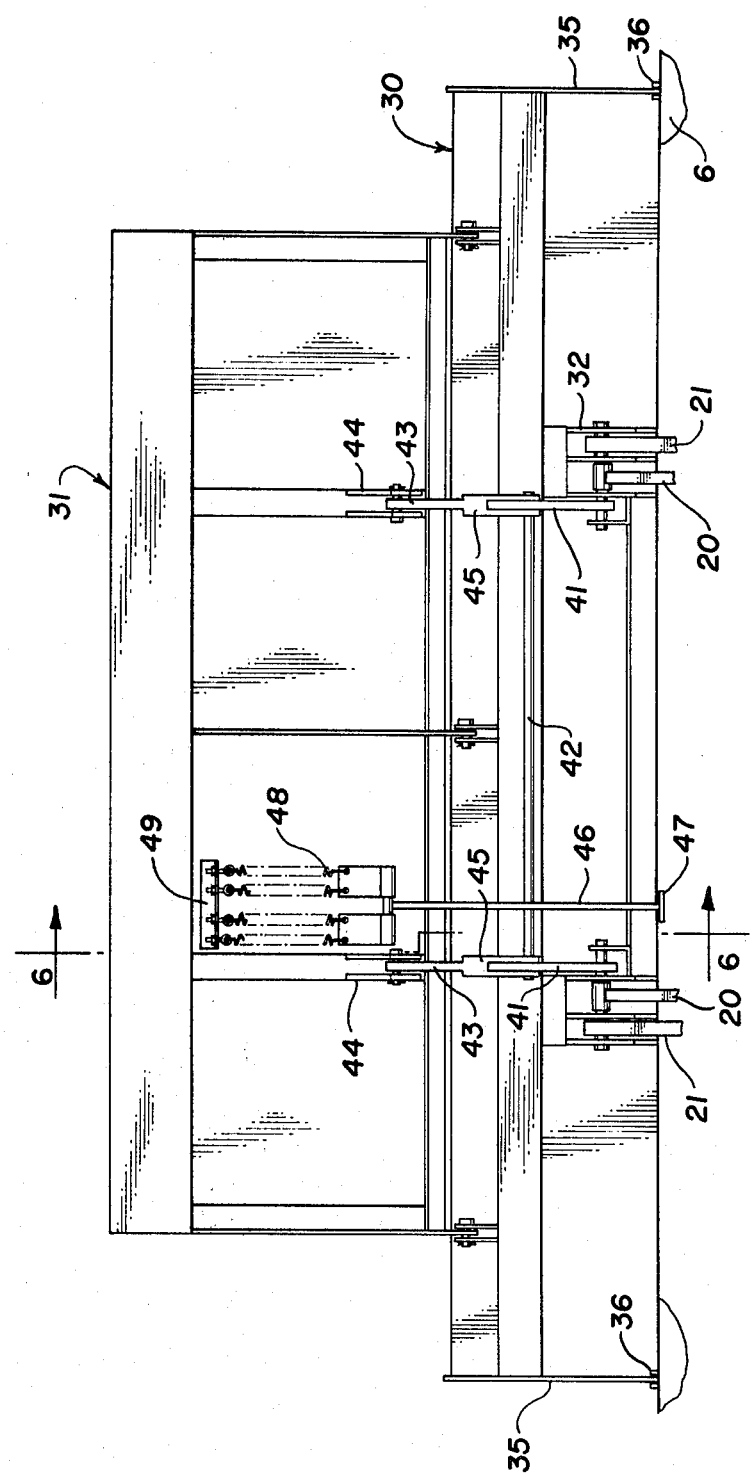
FIG. 5 is a bottom view of the cargo platform in the load position.

FIG. 5 is a view of the under side of the elevator platform, when it is in the load position, particularly illustrating the locking and folding mechanism for both maintaining the two platform sections in the load position and effecting the folding of the folding platform to the tucked position. The lift and parallel arms are shown fragmentarily, pivotally connected to the arm brackets 32 on the base platform, and the pivot 33 is indicated. A pair of inner arms 41 are pivotally mounted at one end about the lift arm pivot 33, extending outwardly therefrom, and are pivotally mounted at the outer ends on a coordinator shaft 42. This coordinator shaft is disposed parallel to the lift arm pivot axis. A pair of outer arms 43 are aligned longitudinally with the respective inner arms 41, and are pivotally mounted at the outer ends at pivot brackets 44 mounted on the folding platform 31 adjacent to the inner edge thereof. The inner ends of the outer arms are nonrotatably secured to the coordinator shaft 42 by means of yokes 45 which confine the respective outer ends of the inner arms 41. The inner and outer arms are disposed in a manner that, in the load position of the folding platform, the confronting ends of the inner and outer arms abut each other to limit the movement of these arms, as will be described.

An actuator lever 46 is disposed between the laterally spaced assemblies of inner and outer arms and parallel thereto. This actuator lever is nonrotatably mounted on the coordinator shaft 42; and it will be seen then that the assembly of the two outer arms 43, the coordinator shaft 42 and the actuator lever 46 all move as a unit. The forward end of the actuator lever includes a transverse latch pin 47, to engage an actuator arm as will be described. A set of four tension springs 48 are connected to suitable yokes at each end; and this tension spring assembly is pivotally connected between brackets 49, secured to the folding platform 31 adjacent to its outer edge, and the outer end of the actuator lever 46.

FIG. 6 is a longitudinal sectional view illustrating the elevator platform and above described locking and folding mechanism in the load position. For an explanation of the functioning of this mechanism, five pivot axes are significant; and these are identified as the inner arm pivot 33 (which coincides with the lift arm pivot), the coordinator pivot 51 which is the axis of the coordinator shaft 42, and the outer arm pivot 52 which is the pivot axes of the outer arms 43 at the brackets 44, the spring pivot 53 which is the pivot axis of the spring assembly 48 at the outer end of the actuator lever 46, and the platform hinge axis 54. In FIG. 6 the locking and folding mechanism is in the locked position; and it will be seen that the coordinator pivot 51 is disposed above a plane defined by the inner arm pivot 33 and the outer arm pivot 52. In this position, the confronting ends of the inner arms 41 and outer arms 43 abut each other in a manner to fix this limiting position of the arms illustrated in FIG. 6. It will also be seen that the spring pivot 53 is disposed generally above the outer arm pivot 52. In this load position of the platform, the tension springs 48 are stressed in tension; and the springs 48 exert a force tending to rotate the assembly of the actuator lever, coordinator shaft, and outer arms in a clockwise direction about the outer arm pivot 52. This, then, defines an over-center mechanism which maintains the inner and outer arms in the described locked position and prevents the folding platform 31 from collapsing. Of course, any load on the folding platform will increase the forces tending to maintain this over-center lock. This lock mechanism is effective for all operations of the cargo elevator as it moves between the bed position and the ground position, resting on the ground surface as illustrated in FIG. 1.

The folding of the folding platform 31 to the tucked position is effected during upward movement of the platforms from the ground position. For the folding and unfolding operations of the cargo platform, the inner end of the actuator lever 46 coacts with an actuator arm 60 pivotally attached to the vehicle cargo bed adjacent to its rearward end at a suitable bracket 61, about an axis parallel to the platform hinge axis. This actuator arm is normally suspended from its pivot; and a control arm 62 is attached to this actuator arm, extending laterally therefrom to enable the vehicle operator to manually swing the actuator arm rearward to effect engagement with the actuator lever as will now be described. The actuator arm includes a recess or notch 63 intermediate its ends, to receive the latch pin 47 of the actuator lever 46; and the actuator arm, then, includes a tail portion which extends below the notch 63.

FIG. 6 illustrates the elevator platform moving up from the ground position; and the actuator arm 60 has been swung rearward by the vehicle operator so that its tail portion engages the actuator lever latch pin 47, and so that the actuator arm will move to engage the notch 63 with the latch pin when the platform moves slightly higher.

FIG. 7 of the drawing illustrates the condition where the platform has moved slightly higher, the latch pin has engaged the notch 63, and this has effected downward movement of the inner end of the actuator lever 46 relative to the base platform 30. It must be remembered that the base platform 30 is moving up during this operation; and the movements of the folding mechanism are described relative to the base platform, rather than relative to the vehicle body. The relative downward movement of the inner end of the actuator lever effects downward movement of the coordinator pivot 51 relative to the inner arm pivot 33; and this effects correspondingly downward and forward movement of the outer arm pivot 52 to commence the folding of the folding platform about the hinge axis 54. Once the actuator lever moves the coordinator pivot 51 below the plane of the inner and outer arm pivots 33 and 52, the over-center lock is released and the weight of the folding platform 31 assists the initial folding movement.

As the base platform 30 continues its upward movement, accompanied by forward movement toward the vehicle bed on the radius of the lift arms, the inner end of the actuator arm swings forward along the radius of the actuator arm notch; and this produces downward and forward movement of the coordinator pivot 51 necessarily drawing the outer arm pivot 52 forward to eventually swing the folding platform through the approximately 135° to the fully tucked position, as shown in FIG. 8.

Desirably some form of securing mechanism such as latching chains will be connected between the vehicle body and the folding platform to assure that it will not be released from the tucked position during vehicle travel. The latch pin 47 of the actuator lever remains engaged in the actuator arm notch 63 at all times, until release is effected upon the opening of the platform again to the load position.

At the completion of the tucking operation the base platform is in abutting and co-planar relation with the vehicle cargo bed as best seen in FIG. 8. The cargo bed may be provided with some kind of rear door such as a vertically sliding door or swinging side doors; and in either event the base platform will not interfere with the operation of the door or doors. The base platform functions as a rear extension of the vehicle cargo bed; and the vehicle may be backed up to a loading dock in the normal manner for lift truck loading or unloading operations. The above mentioned load taking side members 35 of the base platform extend outwardly beyond the outer edge of the base platform for engagement with the loading dock to prevent damage to the base platform and particularly the platform hinge structure.

For opening or unfolding the folding platform, the cargo elevator is moved downward from the bed position and, since the actuator arm and actuator lever remain engaged, the unfolding of the folding platform is effected automatically. As the base platform moves downward and outward on the lift arms, the inner end of the actuator lever will begin to raise, relative to the base platform, pivoting both the actuator lever and forward arms about the coordinator pivot; and the resultant movement of the outer arm pivot effects the outward swinging of the folding platform 31. FIG. 9 illustrates the initial portion of this operation wherein the folding platform has swung outward about 45° to a generally 90° position relative to the base platform. As the downward movement of the base platform continues, the actuator lever moves toward the generally horizontal position, thereby swinging the folding platform toward its horizontal or load position. When the coordinator pivot 51 passes through the plane of the inner and outer arm pivots 33 and 52, the springs 48 cause the mechanism to snap into the over-center lock position, and this will effect release of the actuator lever latch pin 47 from the notch 63 of the actuator arm. The actuator arm then swings to its normally vertically suspended position where it will not interfere with the normal lowering and raising of the elevator platform.

A suitable power and control unit for the hydraulic power cylinder 18 (not shown) will be mounted adjacent to the rear of the cargo bed adjacent to the cargo elevator, and also adjacent to the control levers 64 for the actuator arm. This control unit will consist of the usual hydraulic pump, power unit for the pump, and a control valve.

EMBODIMENT OF FIGS. 10 AND 11

Figure 10:
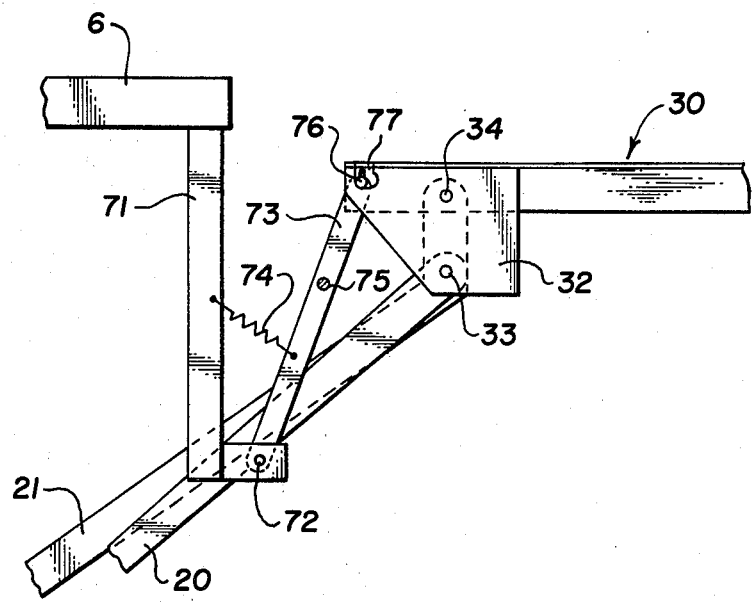
FIGS. 10 and 11 are fragmentary side views illustrating an alternative vertical storage position of the elevator platform.
Figure 11:
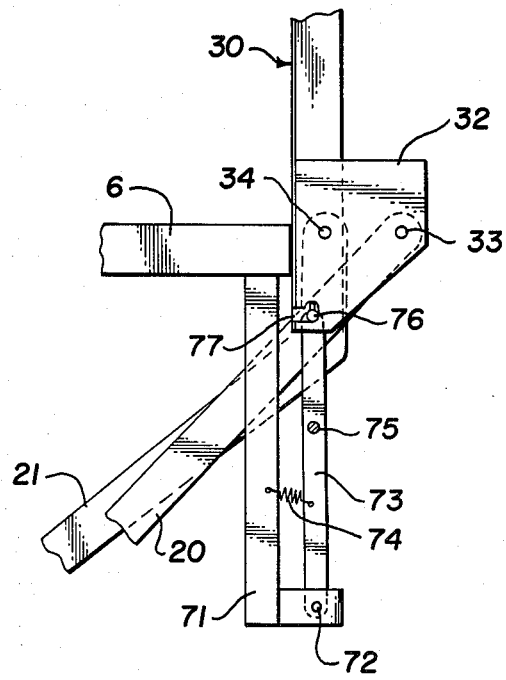

FIGS. 10 and 11 of the drawing illustrate an additional or alternative function of a cargo elevator as described above, namely that the elevator platform may be rotated from the generally horizontal load position to a generally vertical storage position when the platform approaches the bed position during upward movement thereof. The mechanism for accomplishing this function may be added to the structure of the folding elevator platform described above; or alternatively, the elevator platform may be a unitary platform not having the folding feature.

FIG. 10 illustrates the platform as it is moving upward and approaching the bed position. An anchor arm 71 is rigidly attached to the cargo bed 6 extending downwardly therefrom; and provides a pivot 72 for an upward extending latch arm 73. A spring 74 urges the latch arm to a vertical position. The latch arm has been moved to the position shown by means of a control arm 75 to engage a latch pin 76 in a slot 77 provided in the arm bracket 32. The latch pin 76 then defines a latch pivot which is disposed inwardly and upwardly from the lift arm pivot 33, when the platform is in the load position.

As the platform continues its upward movement, the latch pivot 76 is caused to be rotated relative to the lift arm pivot 33; and this effects the rotation of the platform 90° to the vertical position, shown in FIG. 11. When this occurs, the parallel arm pivot 34 is also necessarily rotated in a forward and downward direction relative to the lift arm pivot 33. Necessarily, a similar movement of the parallel arm pivot at the mounting frame must occur; and this is permitted by the described mounting of the inner ends of the parallel arms on the rotatable arm brackets 22. When the platform is lowered from the bed position, it will return automatically to the load position, and the latch arm 73 will release from the notch 77 after it has effected the pivoting of the platform.

OPERATION, FEATURES AND ADVANTAGES

The operation of the folding cargo platform will now be described briefly, starting with the elevator in the tucked position illustrated in FIG. 8.

The control is operated to allow extension of the power cylinder and downward movement of the base platform and, since the actuator lever 46 is latched with the actuator arm 60, this downward movement will effect the unfolding of the folding platform to the load position. When the load position of the folding platform is reached, the actuator arm will swing free of the actuator lever so as not to interfere with subsequent raising and lowering operations of the lift platform. After the unfolding, the cargo elevator may continue downward to the ground position or may be raised to the bed position. To raise the platform the control is simply operated to effect contraction of the power cylinder.

For lowering the platform from the bed position to the ground position, the control is actuated in the same manner described for opening the folding platform, that is allowing the platform to lower under the control of the control unit.

For effecting the folding of the folding platform, the elevator is raised from the ground position in the same manner previously described; however, simultaneously the control lever 64 is operated to swing the actuator arm 60 rearward to engage the tail portion of the actuator arm with the latch pin 47 of the actuator lever. Then, as the platform moves upward, the latch pin will move into the actuator arm notch 63 and effect the folding of the folding platform. During this folding operation, the base platform moves to its bed position; and securing devices, such as chains (not shown), may be attached between the vehicle body and the folding platform to secure it and maintain it in the tucked position during travel of the vehicle.

For the operation of a cargo elevator having the vertical storage feature, as the cargo elevator is moved toward the bed position the latch arm 73 is engaged in the notch 77 to effect upward rotation of the platform to the vertical position, and this is achieved when the bed position is reached. In the vertical position, the platform may function as a rear gate for the cargo bed. The control is simply reversed to effect rotation of the platform from the vertical position to the load position, during initial downward movement thereof.

What has been described is a unique cargo elevator having the feature of full power for moving the elevator platform between an extended load position and a fully tucked storage position, or alternatively, to a vertical storage position.

An important feature of the invention is the use of a torque shaft for transferring the lifting power directly from a hydraulic power cylinder to the lift arms; and particularly that the lifting torque is applied to the shaft immediate its ends with the lift arms being fixed to the shaft at opposite ends thereof, equi-distant from the point of application of the lifting torque.

A principal feature and advantage of the invention is that the cargo elevator is fully powered both for raising and lowering the elevator in the load position, between the ground position and the bed position, and also for moving the folding platform from the load position to the fully tucked position and back to the load position. An ancillary feature and advantage of the invention is that all of these functions are performed with a single power unit such as a hydraulic power cylinder.

Another important feature and advantage of the invention is that, in the stored position wherein the folding platform is fully tucked under the base platform and the vehicle bed, the entire assembly is inclined downwardly and inwardly from the edge of the bed so that the assembly is protected from damage. An ancillary feature is that, in this tucked position, the truck may be backed to a loading dock in a conventional manner, for lift truck loading or unloading operations; and the mechanism will not interfere with the opening and closing of the doors of the cargo body.

Another feature of the invention is that the elevator platform may be rotated to a vertically stored position where it will either overlie the doors of the cargo vehicle or may function in this position as a closing gate for a cargo body. This also may be accomplished with the same single power unit. An advantage of the vertical storage position is that the rear of the vehicle is opened up for the mounting of a trailer hitch for towing a following cargo trailer.

While preferred embodiments of the invention have been illustrated and described, it will be understood by those skilled in the art that changes and modifications may be resorted to without departing from the spirit and scope of the invention.

What is claimed is:

1. A cargo elevator, for attachment to a cargo vehicle having a cargo bed, comprising
   a mounting frame for attachment to the vehicle, under said cargo bed adjacent to a loading station;
   a torque shaft rotatably supported in said mounting frame; and a fluid power cylinder supported in said mounting frame for oscillating said torque shaft about its axis;
   at least one lift arm nonrotatably mounted on said torque shaft; at least one parallel arm rotatably mounted on said mounting frame;
   an elevator platform including a base platform pivotally mounted on said lift and parallel arms in a manner to maintain said base platform in a generally horizontal position relative to the horizontal cargo bed, and a folding platform hingedly attached to said base platform;
   an articulated locking and folding mechanism connected between fixed pivots on said base platform and said folding platform, for effecting the locking of said folding platform in the plane of said base platform, and for effecting the downward folding and unfolding of said folding platform; said mechanism including an actuator lever;
   an actuator arm pivotally mounted on said vehicle to be swung into engagement with said actuator lever;
   said actuator arm being engageable with said actuator lever, during upward movement of said elevator platform, to effect the folding of said folding platform to a stored position under said base platform and said cargo bed; and said engaged actuator arm and actuator lever effecting the unfolding of said folding platform during downward movement of said elevator platform to an extended load position thereof, and effecting the locking of said folding platform in said load position.

2. A cargo elevator as set forth in claim 1
said mounting frame including a pair of axially aligned and spaced sleeves defining bearing means for said torque shaft; said torque shaft having a radial arm projecting therefrom intermediate its ends, between said bearing sleeves, for connection to said fluid power cylinder;
a pair of lift arms nonrotatably mounted on said torque shaft adjacent to its opposite ends.

3. A cargo elevator as set forth in claim 2
a pair of laterally spaced parallel arms pivotally mounted on said mounting frame adjacent to the mountings of respective lift arms.

4. A cargo elevator as set forth in claim 3
a pair of arm brackets rotatably mounted on said torque shaft adjacent to its opposite ends; said arm brackets having pivot means for pivotally supporting said parallel arms; and said arm brackets and said mounting frame having coacting structure for limiting rotation of said arm brackets to a limit position, to maintain said base platform in said generally horizontal position.

5. A cargo elevator as set forth in claim 2
said mounting frame being generally planar and disposed at a downward and inward angle from the edge of said cargo bed at said loading station; said spaced sleeves forming the lower end of said mounting frame; the upper end of said frame being secured to said cargo bed at said loading station.

6. A cargo elevator as set forth in claim 1
said articulated mechanism including at least one inner arm having its proximal end pivotally mounted on said base platform at an inner arm pivot, at least one outer arm having its proximal end pivotally mounted on said folding platform at an outer arm pivot, and the distal ends of said inner and outer end arms being pivotally connected at a coordinator pivot; and said actuator arm being connected to said outer arm for movement therewith;
said coordinator pivot of said arms being movable to an upper limiting position slightly above a plane defined by said inner arm pivot and said outer arm pivot; said limiting position of said coordinator pivot defining an over-center lock position of said articulated mechanism;
the folding of said folding platform being effected by the downward movement of said actuator arm, relative to said base platform, to effect concurrent downward movement of said coordinator pivot through and below said plane to unlock and fold said folding platform;
and the unfolding of said folding platform being effected by reverse movement of said actuator lever relative to said base platform.

7. A cargo elevator as set forth in claim 6
said actuator arm having an outer end disposed above said plane in the load position of said folding platform; tension spring means connected between said outer end of said actuator arm and said folding platform; said tension spring means exerting a force on said actuator arm tending to rotate said coordinator pivot above said plane and thereby maintain said over-center lock position of said articulated mechanism.

8. A cargo elevator as set forth in claim 1, said articulated mechanism comprising
a pair of laterally spaced outer arms having their proximal ends pivotally connected to said folding platform at an outer arm pivot; a coordinator shaft nonrotatably connected to the distal ends of said outer arms; a pair of laterally spaced inner arms having their proximal ends pivotally connected to said base platform at an inner end pivot, and having their distal ends pivotally connected to said coordinator shaft at a coordinator pivot;
an actuator lever nonrotatably mounted on said coordinator shaft intermediate its ends, and extending generally parallel to said outer arms; said articulated mechanism having a limited over-center lock position, when said folding platform is in its load position, wherein said coordinator pivot is disposed above the plane defined by said inner arm pivot and said outer arm pivot;
a tension spring connected between the outer end of said actuator lever and said folding platform, urging said actuator lever in a direction to maintain said coordinator pivot above said plane to maintain said over-center lock position;
said inner end of said actuator lever being engageable with said actuator arm, when said base platform is moving upward, to move said coordinator pivot downward relative to said plane and to said base platform to unlock said lock mechanism and effect the folding of said folding platform; and said engaged actuator arm and actuator lever being effective, during downward movement of said base platform, to move said coordinator pivot toward and through said plane to unfold said folding platform and set said over-center lock position.

9. In a cargo elevator for attachment to a cargo vehicle having a cargo bed
a mounting frame, for attachment to the vehicle under said cargo bed adjacent to a loading station, including horizontally disposed, axially aligned bearing sleeves as a lower frame member; said mounting frame being generally planar, and being secured at its upper end to said cargo bed at said loading station; and said frame being disposed at an angle inclined downwardly and inwardly from said cargo bed at said loading station;
a torque shaft rotatably supported in said bearing sleeves; a torque arm extending radially from said torque shaft; and a fluid power cylinder connected between the upper end of said mounting frame and said torque arm for oscillating said torque shaft and torque arm about their axis;
a pair of lift arms nonrotatably mounted on said torque shaft adjacent to its ends; a pair of parallel arms rotatably mounted on said mounting frame;
a pair of arm brackets rotatably mounted on said torque shaft adjacent to its ends; said arm brackets having pivot means for pivotally supporting said parallel arms; said arm brackets and said mounting frame having coacting structure for limiting rotation of said arm brackets to a limit position, and thereby to maintain an elevator platform in a load supporting position;
and said elevator platform being pivotally mounted on said lift and parallel arms in a manner to maintain said elevator platform in said load supporting position.

10. In a cargo elevator as set forth in claim 9 said arm brackets being rotatable about 90° from said limit position, to enable rotation of said elevator platform from a generally horizontal load position to an upright, generally vertical storage position.

11. In a cargo elevator as set forth in claim 10 said elevator platform being movable normally between a bed position, co-planar with said vehicle cargo bed, and a ground position resting on the ground; and linkage means between said vehicle and said elevator platform operative selectively for effecting rotation of said elevator platform, about its lift arm pivot axis, to said vertical storage position, as said elevator platform is moving toward said bed position.

12. In a cargo elevator as set forth in claim 9 said bracket arm pivot means for said parallel arms being disposed, relative to the axis of said torque shaft and to said rotation limiting coacting structure, that the reaction force of said lift arms acting on said torque shaft is opposed by the reaction force of said parallel arms acting on said torque shaft through said arm brackets.

13. In a cargo elevator as set forth in claim 12 said lift arms being compression members exerting reaction forces directed generally inward on said torque shaft; said parallel arms being tension members exerting reacting forces directed generally outward on said arm brackets; and said arm brackets transmitting said reaction forces to said torque shaft in a direction generally outward, in opposition to the reaction forces of said lift arms.

14. In a cargo elevator for attachment to a cargo vehicle having a cargo bed; an elevator platform including a base platform and a folding platform hingedly attached to said base platform; said elevator platform being mounted, by means of said base platform, to be raised and lowered between a ground position and a bed position, with said base platform being maintained in a generally horizontal position during these movements; the improvement comprising
an articulated locking and folding mechanism connected between fixed pivots on said base platform and said folding platform, for effecting the locking of said folding platform in the plane of said base platform, and for effecting the downward folding and unfolding of said folding platform; said mechanism including an actuator lever;
said actuator lever being engageable with an actuator arm on said vehicle, during upward movement of said elevator platform, to effect the folding of said folding platform from a load position to a stored position under said base platform and said cargo bed; and said engaged actuator lever and actuator arm effecting the unfolding of said folding platform to said load position, during downward movement, of said elevator platform and effecting the locking of said folding platform in said load position.

15. A cargo elevator as set forth in claim 14 said articulated mechanism including at least one inner arm having its proximal end pivotally mounted on said base platform at an inner arm pivot, at least one outer arm having its proximal end pivotally mounted on said folding platform at an outer arm pivot, and the distal ends of said inner and outer end arms being pivotally connected at a coordinator pivot; and said actuator arm being connected to said outer arm for movement therewith;
said coordinator pivot of said arms being movable to an upper limiting position slightly above a plane defined by said inner arm pivot and said outer arm pivot; said limiting position of said coordinator pivot defining an over-center lock position of said articulated mechanism;
the folding of said folding platform being effected by the downward movement of said actuator arm, relative to said base platform, to effect concurrent downward movement of said coordinator pivot through and below said plane to unlock and fold said folding platform;
and the unfolding of said folding platform being effected by reverse movement of said actuator lever relative to said base platform.

16. In a cargo elevator as set forth in claim 15 said actuator arm having an outer end disposed above said plane in the load position of said folding platform; tension spring means connected between said outer end of said actuator arm and said folding platform; said tension spring means exerting a force on said actuator arm tending to rotate said coordinator pivot above said plane and thereby maintain said over-center lock position of said articulated mechanism.

17. In a cargo elevator as set forth in claim 14, said articulated mechanism comprising
a pair of laterally spaced outer arms having their proximal ends pivotally connected to said folding platform at an outer arm pivot; a coordinator shaft nonrotatably connected to the distal ends of said outer arms; a pair of laterally spaced inner arms having their proximal ends pivotally connected to said base platform at an inner end pivot, and having their distal ends pivotally connected to said coordinator shaft at a coordinator pivot;
an actuator lever nonrotatably mounted on said coordinator shaft intermediate its ends, and extending generally parallel to said outer arms; said articulated mechanism having a limited over-center lock position, when said folding platform is in its load position, wherein said coordinator pivot is disposed above the plane defined by said inner arm pivot and said outer arm pivot;
a tension spring connected between the outer end of said actuator lever and said folding platform, urging said actuator lever in a direction to maintain said coordinator pivot above said plane to maintain said over-center lock position;
said inner end of said actuator lever being engageable with said actuator arm, when said base platform is moving upward, to move said coordinator pivot downward relative to said plane and to said base platform to unlock said lock mechanism and effect the folding of said folding platform; and said engaged actuator arm and actuator lever being effective, during downward movement of said base platform, to move said coordinator pivot toward and through said plane to unfold said folding platform and set said over-center lock position.

* * * * *